March 21, 1967 E. I. VALYI 3,310,621
METHOD FOR MAKING PLASTIC TUBES
Filed July 24, 1964 2 Sheets-Sheet 1
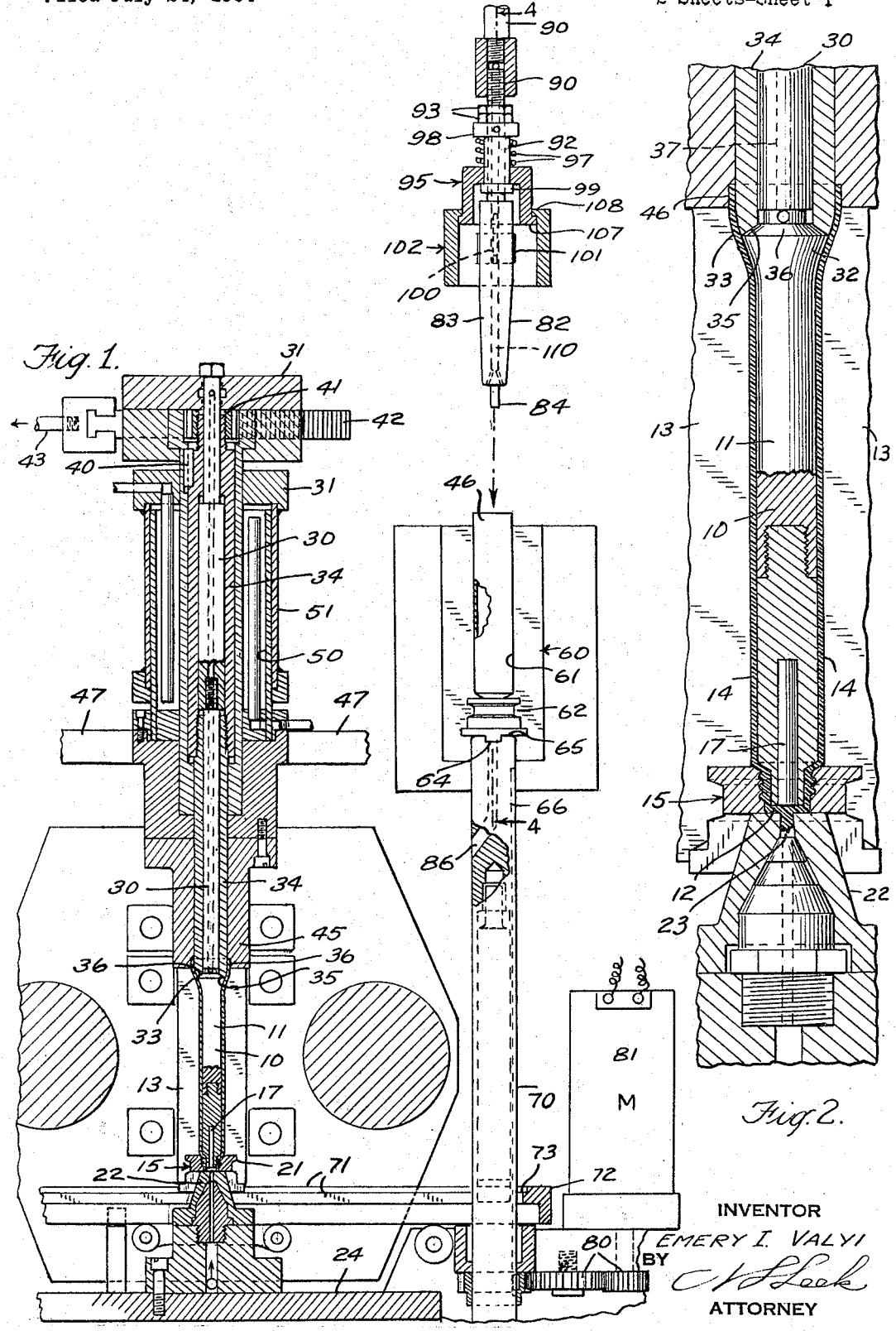
INVENTOR
EMERY I. VALYI
BY
ATTORNEY March 21, 1967     E. I. VALYI     3,310,621
METHOD FOR MAKING PLASTIC TUBES
Filed July 24, 1964     2 Sheets-Sheet 2
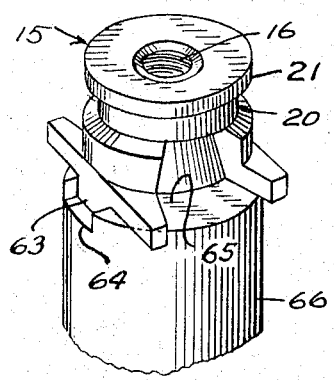
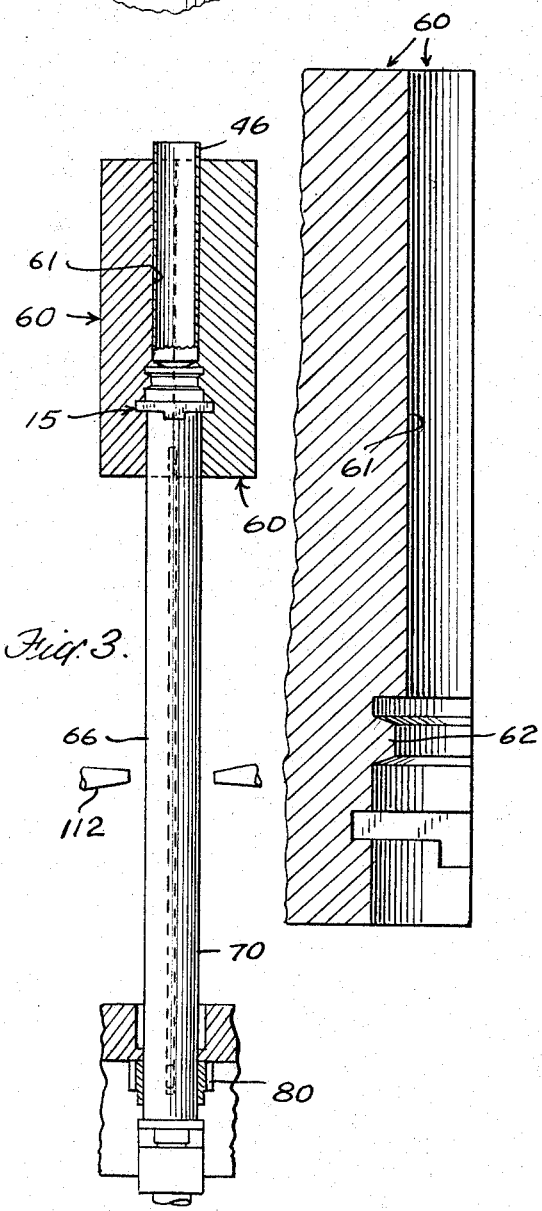
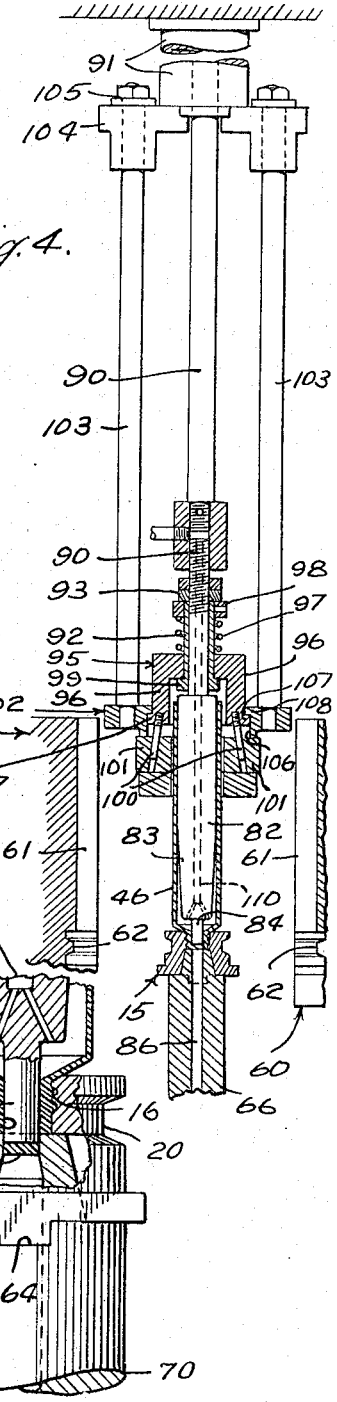
INVENTOR
EMERY I. VALYI
BY
ATTORNEY

United States Patent Office 3,310,621
Patented Mar. 21, 1967

3,310,621
METHOD FOR MAKING PLASTIC TUBES
Emery I. Valyi, Bronx, N.Y., assignor to Wheeling Stamping Company, a corporation of West Virginia
Filed July 24, 1964, Ser. No. 384,942
5 Claims. (Cl. 264—97)

This invention relates to a method and apparatus for making plastic containers and more particularly to a method and apparatus for making plastic tube-containers of the type commonly used for dispensing cosmetic lotion and the like.

An object is to provide a method of the above type having novel and improved characteristics.

Various other objects and advantages will be apparent as the nature of the invention is more fully disclosed.

The invention ultilizes an apparatus of the general type disclosed in my co-pending application, Ser. No. 353,004, filed Mar. 18, 1964, which includes a blow core on which a parison is injected in a parison die. The blow core is then retracted axially into a blow mold wherein the parison is blown into the form of the finished bottle or the like. After blowing, the blow core is further retracted from the blow mold into a conditioning chamber, the blow mold with the bottle therein is shifted laterally out of the path of the blow core for cooling and the bottle is discharged therefrom while the blow core is advanced into the parison die for the injection of the next parison.

The present invention applies particularly to the making of an object such as a tube container having a neck which is considerably smaller than the tube and which has an extremely small opening such that it cannot be formed by the usual molding operation.

In accordance with the present invention, the tube is formed with a shaped end or neck portion disposed at the end of the blow core adjacent the injection nozzle. An internally threaded confining member or neck ring is secured in the parison die adjacent the end of the blow core and so positioned that the plastic is injected through the neck ring to form the parison. The open end of the tube, that is, the end opposite the neck, is formed by a sleeve registering with the parison die and movable with the blow core from the parison die into the blow mold for holding the parison during blowing.

After the parison has been formed by injection, the parison die is opened sufficiently to release the neck ring which is retracted with the blow core into the blow mold wherein the neck ring is again clamped during the blowing step. During the transfer, the neck ring is carried by the plastic of the neck portion of the tube and may be further supported magnetically by means of a magnet in the end of the blow core.

After the blowing step, the blow core and sleeve are retracted and the blow mold is shifted transversely into ejecting position. In this position a neck ring carrier is advanced to contact the exposed surface of the neck ring and support the same. The blow mold is then opened to release the tube and to provide clearance for a transfer mandril and clamp which then descends to enter the formed tube from its open end. The transfer mandril may carry a punch to pierce the plastic of the neck to size or to form the opening therein. The clamp then grips the walls of the tube while the neck ring carrier is rotated to unscrew the neck ring from the threaded exterior of the neck of the tube. The finished tube is then blown off of the mandril and the neck ring carrier deposits the neck ring on a carriage which transfers it into the parison die for the start of the next injection cycle.

The nature of the invention, the details of the apparatus and the features of operation will be better understood from the following detailed description, taken in connection with the accompanying drawings in which a specific embodiment has been set forth for purposes of illustration.

In the drawings:

FIG. 1 is a vertical section through an apparatus embodying the invention showing the blow core in injection position and the blow mold in discharge position;

FIG. 2 is a similar section showing the parison die station on a larger scale;

FIG. 3 is a section similar to FIG. 1 showing the blow mold in blow position with the blow core removed after blowing;

FIG. 4 is a section through the blow mold in release position taken on the line 4—4 of FIG. 1 showing the transfer mandril inserted into the tube;

FIG. 5 is an enlarged vertical section showing a portion of the transfer mandril, neck ring and carrier and FIG. 6 is a prospective detail view of the neck ring and carrier.

Referring to the drawings in more detail, the apparatus is shown as comprising a blow core 10 having a cylindrical surface 11 and an end surface 12 adapted to form the inner walls of a parison die station and cooperating with outer parison die members 13 to form the sides of a parison 14. A confining member, shown as a neck ring 15 having a threaded inner surface 16 has a peripheral groove 20 which is clamped by a flange 21 on the parison die members 13. An injection nozzle 22 having an injection opening 23 registering with the neck ring 15 is mounted in a fixed frame 24 and is supplied with plastic for molding from a suitable source, not shown. The blow core 10 is carried by a stem 30 which extends upwardly to a cross head 31 by which the blow core is actuated. The upper end of the blow core 10 is tapered outwardly at 32 and the outer parison die members 13 are similarly tapered at 33 to register with a sleeve 34 which is slidably mounted on the stem 30 and has an end shoulder 35 registering with a similar shoulder 36 on the blow core 10 to provide an opening for blow air when the sleeve 34 is retracted. The stem 30 is formed with an axial air passage 37 communicating with the opening between the shoulders 35 and 36 for supplying blow air to the interior of the parison. The sleeve 34 has a key 40 to prevent turning and is actuated by a pinion 41 which in turn is driven by a rack 42 attached to a rod 43 which is actuated by a suitable piston, not shown. An outer sleeve 45 registers with the parison die to form the end rim 46 of the parison. This outer sleeve 45 is carried by a cross head 47 by which it is raised and lowered as required.

The cross head 47 also carries a cylinder sleeve 50 which is adapted to telescope within a sleeve 51 carried by the cross head 31 and when extended to form a conditioning chamber for the blow core. The neck ring 15 is preferably made of magnetic material and a permanent magnet 17 is disposed in the end of the blow core 10 in a position to assist in supporting the neck ring when the blow core is retracted with the parison thereon and with the plastic neck of the injected parison retained between the blow core and the neck ring.

The blow mold comprises a pair of parts 60 having a cavity 61 adapted to form the tube and having end walls formed with a flange 62 adapted to enter the groove 20 in the neck ring for clamping the same in place during the blowing step. The lower surface of the neck ring is formed with lugs 63 which are adapted to enter recesses 64 in the upper surface 65 of a neck ring carrier 66 when the latter is in contact with the neck ring as shown in FIG. 1. The neck ring carrier 66 is raised and lowered by suitable means, not shown. The carrier 66 extends through an elongated slot 71 in a carriage 72 which is shiftable transversely by a piston not shown. The bottom surface of the neck ring is adapted to seat within the groove 73 of the carriage 72 so that the neck ring 15 is transferred thereby from the carrier 66 to the parison die. After the neck ring 15 has been clamped by the parison die as above described, the carriage can be returned to position to register with the carrier 66.

Suitable means, such as a train of gears, is provided to rotate the carrier 66 so as to unscrew the neck ring 15 from the threaded neck of the finished tube. The gear train may be actuated by suitable means such as a motor 81.

A transfer mandril 82 is disposed in a position to enter the open end of plastic tube in the blow mold while the blow mold is in the transfer station with the neck ring 15 engaged and supported by the neck ring carrier 66. The transfer mandril 82 has a peripheral surface 83 adapted to fit within the interior of the plastic tube and at its end carries a punch 84 which is adapted to pierce the plastic wall of the neck of the tube to form a neck opening 85. The neck ring carrier 66 is formed with an opening 86 to receive the plug 87 which is punched out of the plastic neck by the punch 84. Plug 87 is formed only if the entire end surface of the neck is used for entry of plastic into the parison mold during the injection step. Depending upon the shape and size of the neck opening, it is frequently possible to inject the plastic into the end periphery of the neck, or only into part of the neck opening. In such instances neck opening 85 is either not at all, or only partly filled with plastic and therefore either no plug or only part of the plug 87 is formed and punched out.

The transfer mandril 82 is carried by a stem 90 which is actuated by a cylinder 91 for raising and lowering the mandril. The stem 90 carries a sleeve 92 which is slidable axially on the stem 90 between an adjustable nut 93 on the stem and the upper surface of the mandril 82. The clamp actuator ring 95 having an outer flange 96 is slidably mounted on the sleeve 92 and is spring pressed downwardly by a spring 97 which seats against a retainer ring 98 which is threaded onto the sleeve 92 for purposes of adjustment. The actuator ring 95 is held by a lower flange 99 on the sleeve 92. The outer flange 96 of the actuator ring 95 carries a set of pins 100 which are adapted to actuate the clamp members to be described. A set of clamp members 101 carried by a clamp ring 102 are adapted to be advanced radially inward into clamping engagement with the outer surface of the plastic tube by means of the pins 100 when the pins are advanced downwardly with respect to clamp members 101. The clamp carrier 102 is mounted for vertical movement on rods 103 which are slidable in supports 104 and are formed at their upper ends with shoulders 105 which limit their downward movement. The flange 96 extends downwardly through a bore 106 in the clamp carrier ring 102 and is formed with an outer shoulder 107 which is adapted to engage a shoulder 108 on the carrier ring 102 for lifting the latter. The transfer mandril 82 is formed with an axial air passage 110 for compressed air which is applied at a suitable time to blow the formed plastic tube from the surface of the mandril.

In the operation of this apparatus the blow core 10 is advanced into the parison die 13 as shown in FIG. 1 with a neck ring 15 clamped by the die members 13 and the outer sleeve 45 is brought into registration with the parison die. If the tube to be produced is to have an open end of pre-determined cross-section, as for example threaded or otherwise contoured, then the outer sleeve 45 may of course contain a suitable die member for that purpose, similar to the neck ring described in my co-pending application above mentioned. The plastic is then injected to form the parison 14. The parison die members 13 are then opened to release the neck ring 15 and the parison 14. The blow core 10 is retracted with the formed parison thereon and with the neck ring 15 carried by the neck of the parison and by the permanent magnet 17. The outer sleeve 45 and the blow core 10 are then retracted together into blow position and the blow mold 60 is closed there-around. The neck ring 15 is clamped in the blow mold 60 and the sleeve 34 is retracted to form the blow opening after which the blow air is supplied for blowing the parison into the blow mold cavity 61.

After blowing, the blow core 10 and the outer sleeve 45 are retracted from the rim 46 of the blown tube and the blow core 10 may be further retracted into the conditioning chamber formed by the cylinder sleeve 50, wherein it is cooled or otherwise processed as by application of a coating, for the next injection step.

The blow mold 60 with the blown tube therein is then shifted transversely out of the path of the blow core and into the discharge position, the post 70 is raised to cause the neck ring carrier 66 to engage and support the neck ring 15. The blow mold 60 is then opened and the transfer mandril 82 is advanced to locate the transfer device in relation to the blown tube and, if necessary, to cause the punch 84 to punch out the neck opening 85 in the neck of the formed tube. The clamp members 101 then close to grip the tube and the post 70 is rotated to unscrew the neck ring 15 from the threaded neck of the formed tube. In the production of tubes whose neck carries no threads, but is for example, instead adapted to carry a slip-on closure, unscrewing of the neck ring is of course not required. Instead, post 70 merely serves to remove the neck ring downward and may be for that purpose equipped with a magnet, better to hold the neck ring. The post 70 is then retracted to deposit the neck ring 15 on the carriage 72 after which the formed tube is blown off the transfer mandril. While being carried by post 70, the neck ring may be cooled or otherwise treated for the next injection cycle, by a suitable fluid spray or the like 112, arranged in the path of retraction of the neck ring. The carriage 72 then shifts to the injection position where the neck ring is again clamped by the parison die 13 after which the carriage returns to transfer position and the cycle is repeated.

The above described apparatus and method provides means for die molding and blowing an object having a small neck opening in a continuous cycle wherein one tube is being discharged from the blow mold and its neck ring removed while a second parison is being injected in the parison die. While a specific mechanism has been shown and described, it is apparent that various changes and modifications may be made therein according to the specific object to be formed.

What is claimed is:

1. The method of forming a hollow article of organic plastic material having a shaped end, in a parison die around a blow core having a free end extending into said parison die and in a blow mold spaced from said parison die and having a cavity conforming to the hollow article to be formed, which comprises molding around said blow core in said parison die a parison having a shaped end while confining said end in a confining member extending beyond the free end of said blow core, said member being supported by and separable from said die, withdrawing the blow core with the parison thereon and with said confining member retained by the shaped end of the parison while the parison is supported by the blow core, from the parison die into said blow mold, supporting the confining member in said blow mold, blowing the parison to conform to the blow mold cavity while retaining the confining member in place on said shaped end, removing the confining member from said blow mold and from said shaped end after blowing, returning the confining member to the parison die and retaining the same in said die for the next molding cycle.

2. In the method set forth in claim 1 the additional step of punching said shaped end to form an opening prior to the removal of the confining member.

3. In the method set forth in claim 1 the additional step of cooling the confining member prior to returning the same to the parison die.

4. The method set forth in claim 1 in which said confining member is internally threaded for forming threads on the exterior surface of said shaped end and said confining member is removed by unscrewing the same from said shaped end.

5. The method set forth in claim 1 in which the confining member is supported and carried at least in part magnetically by said blow core.

References Cited by the Examiner

UNITED STATES PATENTS

| 2,562,523 | 7/1951 | Brunet | 18—5 |
| 2,878,513 | 3/1959 | Slaughter | 264—97 |
| 3,184,524 | 5/1965 | Whiteford | 264—97 XR |

FOREIGN PATENTS

| 634,388 | 11/1963 | Belgium. |
| 1,062,002 | 7/1959 | Germany. |

ROBERT F. WHITE, *Primary Examiner.*

R. B. MOFFITT, *Assistant Examiner.*